US007639250B2

(12) United States Patent
Xu et al.

(10) Patent No.: US 7,639,250 B2
(45) Date of Patent: Dec. 29, 2009

(54) SKETCHING REALITY

(75) Inventors: Ying-Qing Xu, Beijing (CN); Sing Bing Kang, Redmond, WA (US); Heung-Yeung Shum, Beijing (CN); Xuejin Chen, Hefei (CN)

(73) Assignee: Microsoft Corporation, Redmond, WA (US)

( * ) Notice: Subject to any disclaimer, the term of this patent is extended or adjusted under 35 U.S.C. 154(b) by 469 days.

(21) Appl. No.: 11/554,970

(22) Filed: Oct. 31, 2006

(65) Prior Publication Data
US 2007/0109310 A1    May 17, 2007

Related U.S. Application Data

(60) Provisional application No. 60/732,384, filed on Nov. 1, 2005.

(51) Int. Cl.
*G06T 15/00* (2006.01)
(52) U.S. Cl. ............... 345/419; 345/420; 345/619; 382/181; 382/204
(58) Field of Classification Search ......... 345/419–427; 382/285
See application file for complete search history.

(56) References Cited

U.S. PATENT DOCUMENTS

| 4,774,685 A | * | 9/1988 | Samuels | ............... 708/270 |
|---|---|---|---|---|
| 5,133,052 A | * | 7/1992 | Bier et al. | ............... 715/234 |
| 5,339,367 A | * | 8/1994 | Roth | ............... 382/199 |
| 5,847,712 A | * | 12/1998 | Salesin et al. | ............... 345/582 |
| 6,229,546 B1 | | 5/2001 | Lancaster et al. | |
| 6,308,144 B1 | | 10/2001 | Bronfeld et al. | |
| 6,912,293 B1 | | 6/2005 | Korobkin | |

FOREIGN PATENT DOCUMENTS

JP    2002032742 A    1/2002

OTHER PUBLICATIONS

Alex P. Pentland. Finding the illuminant direction. Nov. 29, 1981. Journal of Optical Society of America. vol. 72, No. 4.*
M. Straforini, C. Coelho, M. Campani, and V. Torre. The Recovery and Understanding of a Line Drawing from Indoor Scenes. Feb. 1992. IEEE Transactions on Pattern Analysis and Machine Intelligence. vol. 14, No. 2. p. 298-303.*
B.S. Manjunath and W.Y. Ma. Texture Features for Browsing and Retrieval of Image Data. Aug. 1996. IEE Transactions on Pattern Analysis and Machine Intelligence. vol. 18, No. 8. p. 837-42.*

(Continued)

*Primary Examiner*—Kent Chang
*Assistant Examiner*—Robert Bader
(74) *Attorney, Agent, or Firm*—Lee & Hayes, PLLC

(57) ABSTRACT

Systems and methods for sketching reality are described. In one aspect, a set of vector primitives is identified from a 2-D sketch. In one implementation, the 2-D sketch is hand-drawn by a user. A 2.5D geometry model is automatically generated from the vector primitives. The 2.5D geometry model is automatically rendered and presented to a user. In one implementation, the user provides 2-D sketch-based user inputs to modify one or more of lighting position, lighting direction, lighting intensity, texture, color, and geometry of the presentation.

13 Claims, 11 Drawing Sheets

OTHER PUBLICATIONS

Ingo Wald, Philipp Slusallek, Casten Benthin, and Markus Wagner. Interactive Rendering with Coherent Ray Tracing. Eurographics 2001. vol. 20, No. 3.*

P. Bellutta, G. Collini, A. Verri, V. Torre, "3D Visual Information from Vanishing Points", Nov. 29, 1989, IEEE, Interpretation of 3D Scenes, 1989, Proceedings., Workshop on, p. 41-49.*

T. Kanade, "A Theory of Origami World", Jun. 1980, Artificial Intelligence, vol. 13, p. 279-311.*

T. Whitted, "An Improved Illumination Model for Shaded Display", 1980, ACM.*

Agusanto, et al, "Photorealistic Rendering for Augmented Reality Using Environment Illumination", Proceedings of the Second IEEE and ACM International Symposium on Mixed and Augmented Reality (ISMAR '03).

Alvarado, et al, "SketchRead: a Multi-Domain Sketch Recognition Engine", UIST '04, Oct. 24-27, Santa Fe, New Mexico.

Ao-yu, et al, "A Survey of Silhouette Detection Techniques for Non-Photorealistic Rendering", Proceedings of the Third International Conference on Image and Graphics (ICIG'04).

Barrett, et al, "Object-Based Image Editing", Association for Computer Machinery, Inc., 2002.

Bartalmio, et al, "Image Inpainting", Electrical and Computer Engineering, University of Minnesota.

Collomosse, et al, "Painterly Rendering Using Image Salience", Department of Computer Science, University of Bath, England.

Correa, et al, "Texture Mapping for Cel Animation", Princeton University.

Coyne, et al, "WordsEye: An Automatic Text-to-Scene Conversion System", ATandT Labs-Research.

Criminisi, et al, "Single View Metrology", Department of Engineering Science, Univesity of Oxford, Oxford UK.

de Souza, et al, "Fragment-Based Image Completion".

Debevec, "Rendering Synthetic Objects into Real Scenes: Bridging Traditional and Image-Based Graphics with Global Illunination and High Dynamic Range Photography", University of California at Berkeley.

Dick, et al, "Combining Single View Recognition and Multiple View Stereo for Architectural Scenes".

Fant, et al, "Textureship: Texture Synthesis as a Photograph Editing Tool", University of Illinois, Urbana-Champaign.

Funkhouser, et al, "Modeling by Example".

Gooch, et al, "A Non-Photorealistic Lighting Model for Automatic Technical Illustration", Department of Computer Science, University of Utah.

Grimstead, et al, "Creating Solid Models from Single 2D Sketches", Univeristy of Wales College of Cardiff.

Halle, "Multiple Viewpoint Rendering", Brigham and Women's Hospital.

Horry, et al, "Tour Into the Picture: Using a Spidery Mesh Interface to Make Animation from a Single Image".

Igarashi, et al, "Teddy: A Sketching Interface for 3D Freeform Design".

Kalnins, et al, "WYSIWYG NPR: Drawing Strokes Directly on 3D Models", Copyright 2002, Association for Computing Machinery.

Kazhdan, et al, "Shape Matching and Anisotropy".

Keren, et al, "Placing Three-Dimensional Models in an Uncalibrated Single Image of an Architectural Scene".

Klein, et al, "Non-Photorealistic Virtual Environments", Princeton University.

Legakis, et al, "Feature-Based Cellular Texturing for Architectural Models", Coyright 2001.

Mahoney, et al, "Three Main Concerns in Sketch Recognition and an Approach to Addressing Them", Palo Alto Research Center, Copyright 2002, American Association for Artificial Intelligence.

Matsuda, et al, "Freehand Sketch System for 3D Geometric Modeling", Dept. of Information and Computer Sciences, Saitama University, Japan, 1997.

Mayer, et al, "Multiresolution Texture for Photorealistic Rendering", Copyright 2001 IEEE.

Mcfadzean, et al, "An Analysis of Architectural Visual Reasoning in Conceptual Sketching via Computlational Sketch Analysis (CSA)", The Open University, Department of Design and Innovation, Milton Keynes, UK, Copyright 1999 IEEE.

Mignotte, "Unsupervised Statistical Sketching for Non-Photorealistic Rendering Models", DIRO, Department d'Informatique et de Recherche Operationnelle, Montreal, Quebec, Canada.

Neyret, et al, "Pattern-Based Texturing Revisted".

Oh, et al, "Image-Based Modeling and Photo Editing", Laboratory for Computer Science, Massachusetts Institute of Technology, Aug. 2001.

Oliveira, et al, "Relief Texture Mapping", University of North Carolina at Chapel Hill.

Parish, et al, "Procedural Modeling of Cities", Copyright 2001.

Reche, et al, "Volumetric Reconstruction and Interactive Rendering of Trees from Photographs", Copyright 2004.

Rother, "A New Approach for Vanishing Point Detection in Architectural Environments", Computatinoal Vision and Active Perception Laboratory (CVAP), Royal Institute of Technology, Stockholm, Sweden.

Schumann, et al, "Assessing the Effect of Non-Photorealistic Rendered Images in CAD", Copyright 1996.

Sezgin, et al, "Sketch Based Interfaces: Early Processing for Sketch Understanding", Copyright 2001.

Shade, et al, "Layered Depth Images".

Simhon, et al, "Sketch Interpretation and Refinement Using Statistical Models", McGill University, Quebec, Canada, Copyright 2004, The Eurographics Association.

Stoyanov, et al, "Current Issues of Photorealistic Rendering for Virtual and Augmented Reality in Minially Invasive Surgery", Proceedings of the Seventh International Conference on Information Visualization, Copyright 2003.

Thorne, et al, "Motion Doodles: An Interface for Sketching Charachter Motion", Copyright 2004.

Turk, "Texture Synthesis on Surfaces", GVU Center, College of Computing, Georgia Institute of Technology, 2001.

Varley, et al, "A System for Constructing Boundary Representation Solid Models from a Two-Dimensional Sketch", Department of Computer Science, CArdiff University, Cardiff, Wales, UK.

Winnemoller, et al, "Rendering Optimisations for Stylised Sketching", Association for Computing Machinery, Inc., Copyright 2003.

Wonka, et al, "Instant Architecture".

Yu, et al, "Inverse Global Illumination: Recovering Reflectance Models of Real Scenes from Photographs", Computer Science Division, University of California at Berkeley.

PCT International Search Report dated Mar. 29, 2007, from counterpart PCT application, PCT/US2006/042783, 3 pages.

* cited by examiner

SKETCHING REALITY

RELATED APPLICATION

This patent application claims priority to US provisional patent application Ser. No. 60/732,384, filed on Nov. 1, 2005, titled "Sketching Reality", which is hereby incorporated by reference.

BACKGROUND

Achieving realism is a major goal in computer graphics, and many approaches ranging from physics-based modeling of light and geometry to image-based rendering (IBR) have been proposed. Realistic imagery has revolutionized the visualization process, allowing for the presentation and exploration of un-built scenes. However, although specialized software graphics applications such as AutoCAD, etc., can be used to create new content for realistic rendering remains tedious and time-consuming. This problem is exacerbated when the content is being designed. Two and one-half dimensional (2.5D) modeling systems are typically cumbersome to use and therefore ill-suited to the early stages of design, unless the design is already well-formulated. Moreover, the 2.5D modeling process requires specialized knowledge in object creation and the application of textures to surfaces.

SUMMARY

Systems and methods for sketching reality are described. In one aspect, a set of vector primitives is identified from a 2-D sketch. In one implementation, the 2-D sketch is hand-drawn by a user. A 2.5D geometry model is automatically generated from the vector primitives. The 2.5D geometry model is automatically rendered and presented to a user. In one implementation, the user provides 2-D sketch-based user inputs to modify one or more of lighting position, lighting direction, lighting intensity, texture, color, and geometry of the presentation.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

DETAILED DESCRIPTION

Overview

Figure 1:
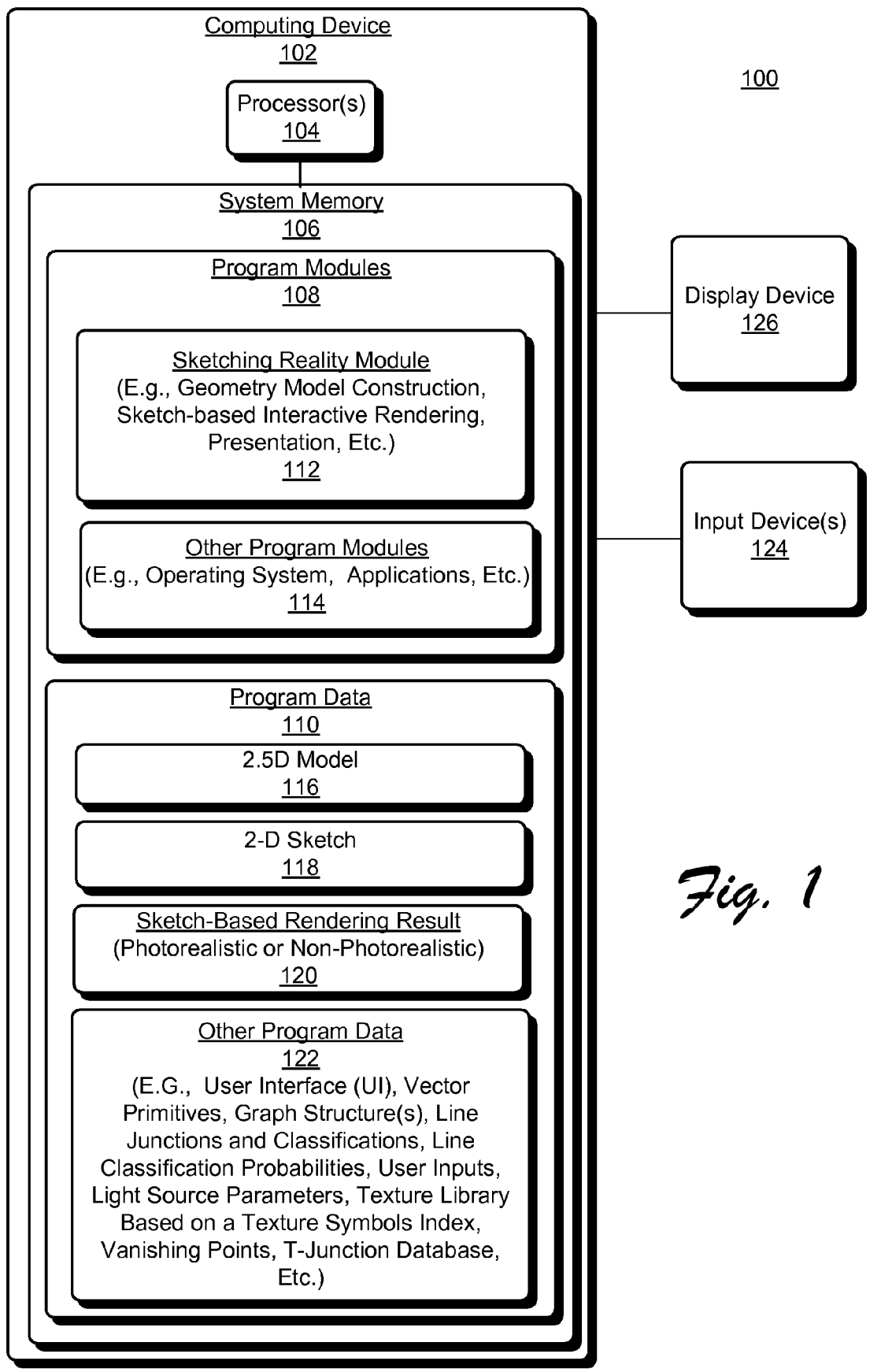
FIG. 1 shows an exemplary system for sketching reality, according to one embodiment.

Advances in modeling and rendering notwithstanding, designers typically continue to favor freehand sketching for conceptual design. Sketching appeals as an artistic medium because of its low overhead in representing, exploring, and communicating geometric ideas. Indeed, such speculative representations are fundamentally different in spirit and purpose from the definitive media that designers use to present designs. Systems and methods for sketching reality, which are described below in reference to FIGS. 1 through 18, provide a seamless way for a user to move from conceptual design freehand drawings to photorealistic or non-photorealistic presentation renderings. This is in contrast to conventional systems and methods that generate non-photorealistic renderings from input photorealistic images.

More particularly, the systems and methods for sketching reality interpret a freehand drawing (a 2-D sketch) to produce realistic imagery. In this implementation, and for purposes of exemplary description, the systems and methods for sketching reality are applied to architectural-based drawings. In different implementations, the systems and methods for sketching reality are applied to freehand drawings that are not architecturally based. In this implementation, the systems and methods for sketching reality, responsive to receiving or otherwise obtaining hand drawn sketch input (e.g., a 2-D sketch), generate a 2.5D geometry model from the sketch input, and allow a user to provide sketch-based input to refine the appearance of the 2.5D model for rendering and presentation to the user. A 2.5D model refers to a scene representation where depth information is available from a single point of view, whereas 3D models have depths all around. A 2.5D model can be viewed as an incomplete 3D model. For example, a 2D painting augmented with depth information would be a 2.5D model.

Specifically, a user draws, for example, a building using a simple input device interface such as an electronic tablet. The systems and methods then analyze the drawn lines to identify junctions and groups of 2.5D parallel lines, from which the 2.5D geometry model/representation is generated. In one implementation, the user refines appearance of the resulting 2.5D geometry model through texture selection operations (e.g., by drawing a rough likeness of the texture on the 2-D sketch) and lighting direction specification (e.g., by hand drawing hatches on surfaces). In one implementation, final product is a realistic rendering/version of the hand-drawn sketch, which can then be used as part of an animation or edited into photographs.

These and other aspects for the systems and methods for sketching reality are now described in greater detail.

An Exemplary System

Although not required, systems and methods for sketching reality are described in the general context of computer-executable instructions executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 shows an exemplary system 100 for sketching reality, according to one embodiment. System 100 includes a computing device 102, for example a general purpose computing device, a server, a laptop, a mobile computing device, and/or so on. Computing device 102 includes one or more processors 104 coupled to a tangible computer-readable storage medium (system memory 106). Processor 108 may be a microprocessor, microcomputer, microcontroller, digital signal processor, etc. System memory 106 includes, for example, volatile random access memory (e.g., RAM) and non-volatile read-only memory (e.g., ROM, flash memory, etc.). System memory 106 comprises computer-program instructions executable by processor 104, and program data that is generated and/or used by respective ones of the computer-program instructions. Such computer-program instructions and program data are respectively shown as program modules 108 and program data 110. Program modules 108 include, for example, sketching reality module 112 and "other program modules" 114 such as an Operating System (OS) to provide a runtime environment, and other applications such as device drivers, etc.

Sketching reality module 112 automatically generates a 2½ dimensional (2.5D) geometry model 116 from a hand drawn 2-D sketch 118 of one or more objects for presentation to a user as a sketch-based photorealistic or non-photorealistic rendering 120 based on the 2.5D geometry model 116 and one or more user inputs. In one implementation, the 2-D sketch 118 represents an architectural design. A non-photorealistic image is an image (or animation) that appears to have been made by hand, watercolor, pen and ink illustration, painting, and/or so on. Sketching reality module 112 presents the rendering result 120 to a user in a user interface (UI). For purposes of exemplary illustration, such a user interface is shown as respective portion of "other program data" 122 (please also refer to FIGS. 14 and 15, which are described below). The user interacts with the UI, for example, to update geometry of the 2.5D model 116 by re-drawing or otherwise modifying the 2-D sketch 118, for example, on an input device 124 (e.g., a graphics pad, etc). Additionally, the user can add visual cues (user input) to the 2-D sketch 118 via the UI to interactively control lighting (position, direction, and intensity) and texture of the rendering 120, as well as specify materials colorization, etc., associated with the rendering 120. Responsive to creation of the 2.5D model 116 and user sketch-based interaction to specify lighting, texture, color, and/or other parameters, sketching reality module 112 renders the photorealistic or a non-photorealistic result 120 based on the 2.5D model 116 and the user inputs.

Figure 2:
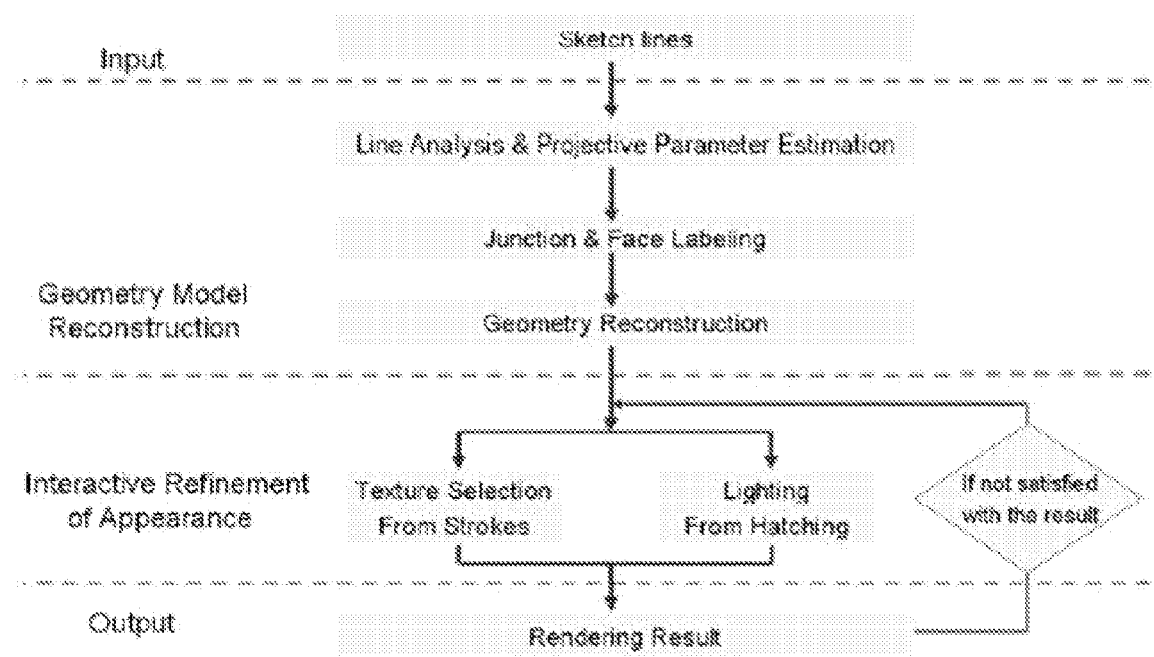
FIG. 2 shows an exemplary overview of the operations of sketching reality, according to one implementation.

FIG. 2 shows an exemplary overview of the operations of sketching reality module 112, according to one implementation. As shown, and in this implementation, the operations of sketching reality module 112 comprise four different stages: (1) an input stage, (2) a geometry model reconstruction stage, (3) an interactive refinement of appearance at stage, and (4) an output/presentation stage. In the input stage, sketching reality module 112 obtains a hand-drawn 2-D sketch 118. In one implementation, sketching reality module 112 includes logic allowing a user to draw 2-D input sketch 118 directly using an input device 124 (e.g., an electronic tablet, etc.) for presentation on display device 126 in the UI 122. In one implementation, display device 126 includes a touch-sensitive screen that allows the user to draw the 2-D input sketch 118 directly on the display device 126. In another implementation, sketching reality module 112 loads to the input sketch 118 from data storage (e.g., a respective portion of program data 110), an input device 124 (e.g., a scanner, remote storage, etc.), and/or so on, for presentation to the user on display device 126. In one implementation, a different application (shown as respective portion of "other program modules" 114) is utilized to generate 2-D input sketch 118.

Figure 3:
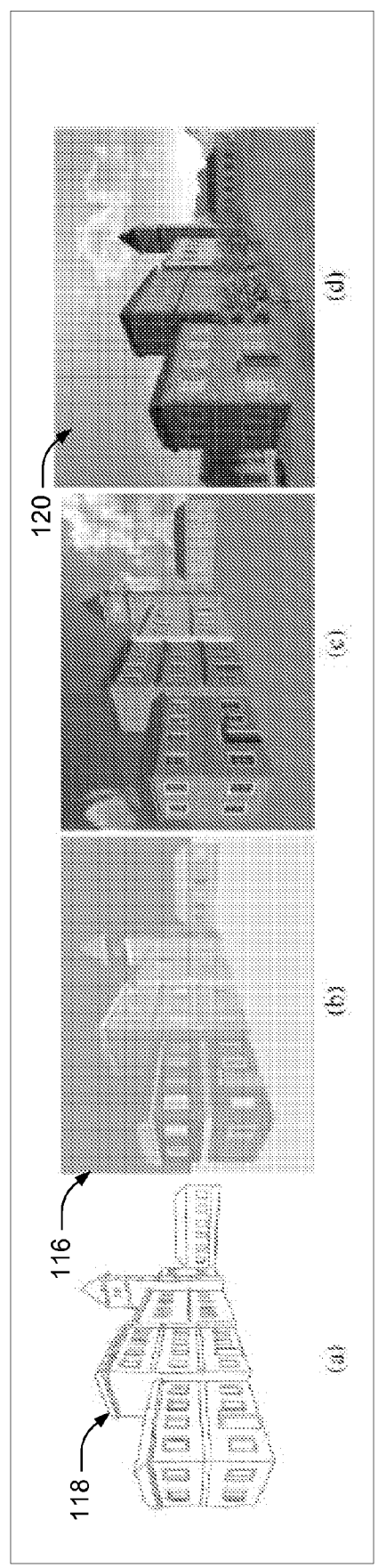
FIG. 3 shows an exemplary set of sketch and image representations, according to one embodiment.

Referring to FIG. 2, in the second stage, geometry model reconstruction, sketching reality module 112 generates the 2.5D geometry 116 by evaluating and interpreting respective ones of the lines of the input 2-D sketch 118 as edges of a structure seen in perspective. In the third stage, interactive refinement of appearance, a user specifies one or more of texture, lighting direction, color, etc. In the fourth stage, output, sketching reality module 112 generates a rendering from 2.5D model 116 in view of the user input(s) to present the sketch-based rendering result 120 to the user via a display device 126. FIG. 3 shows an exemplary set of sketch and image representations, according to one embodiment. In particular, (a) represents an exemplary 2-D input sketch 118; (b) represents an exemplary 2.5D model representation 116 of the exemplary input sketch; (c) represents an exemplary appearance of the exemplary 2.5D model 116 after a user has specified texture and lighting assignments; and (d) represents an exemplary final sketch-based rendering result 120 (photo composite). 2-D sketch 118 is a sketch composed of a set of vector lines or curves.

Exemplary Geometry Model Reconstruction

In this implementation, geometry model reconstruction operations of sketching reality module 112 identify groups of mutually perpendicular lines (in 3-D), the vanishing points, and camera intrinsic parameters by analyzing the input 2-D sketch 118. Next, sketching reality module 112 identifies the type of junction associated with each vertex in the identified line segments, and associates an ordered set of vertices with each phase of the 2.5D model 116. These operations are followed by estimating 3-D locations of the vertices, after which the geometry of the 2.5D model 116 has been identified.

Identifying Vector Primitives

Sketching reality module 112 identifies vector primitives (e.g., points and lines) associated with 2-D input sketch 118.

Such vector primitives are shown as respective portions of "other program data" 122. Since the identified lines may not be straight (e.g., squiggly or non-linear, hand-drawn lines), sketching reality module 112 vectorizes the identified lines to generate straight lines and corresponding vector data. TABLE 1 shows an exemplary set of data generated by vectorizing (i.e., generating line vectors) line segments from a hand drawn 2-D sketch 118.

TABLE 1

EXEMPLARY VECTOR-BASED 2-D SKETCH DATA

Line_num 20
427 685 --> 427 525 427 525 --> 664 476 427 688 --> 665 586 665 586 --> 664 476
427 687 --> 291 563 426 525 --> 255 453 292 564 --> 292 485 291 565 --> 95 610
95 610 --> 96 505 98 507 --> 291 485 258 454 --> 258 487 448 477 --> 546 461
449 476 --> 368 454 449 478 --> 450 295 450 295 --> 546 309 546 309 --> 545 461
450 294 --> 369 316 369 316 --> 369 453 664 475 --> 545 449 258 455 --> 366 439

// End of TABLE 1

In the example of TABLE 1, sketching reality module 112 determines that 2-D sketch 118 includes 20 lines. In one implementation, a least squared method is used to fit a straight line and a cubic Bezier curve is used to fit a curve. For a hand drawn line or curve, a line vector/curve is generated with two endpoints A, B. In this implementation, a line segment can represent a line or a curve.

Sketching reality module 112 generates a graph structure G=(V, E) from the identified vector primitives, wherein V is the set of all the endpoints of the lines and E is the set of lines. The graph structure is shown as a respective portion of "other program data" 122. The graph structure indicates spatial relations between respective ones of the identified points and the straightened lines (i.e., the vector primitives). $V\{v_i\}, i=0\ldots n_v$ is the set of all points of the sketch 118. In addition, $E\{l_i\}, i=0\ldots n_l$ is the set of all lines in the sketch 118, where the two endpoints of $l_i$ is in V. Sketching reality module 112 uses the graph structure to classify lines as left, right or vertical and identify line segment vanishing points. These classifications and vanishing points are then used to identify a set of line segment endpoint junctions/intersection types. Using the identified line segments, the identified line segment junction types and described line connectivity probability criteria, sketching reality module 112 maps respective ones of the identified line segments to respective surfaces/polygons of the 2.5D model 116, as described below.

Line Analysis

Figure 4:
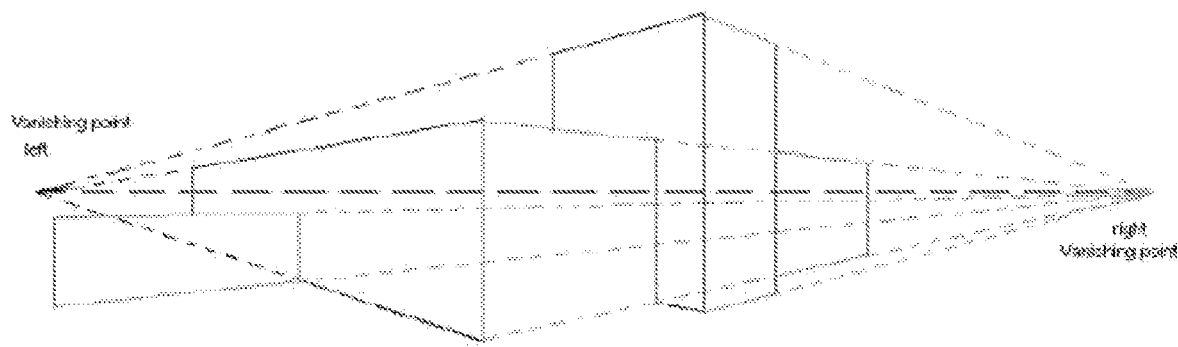
FIG. 4 is an exemplary illustration of an architectural design to show that lines can be classified according to line direction(s) and vanishing point(s), according to one embodiment.

Most architectural sketches are composed of lines that are mutually orthogonal in 3-D space: left, right or vertical (respectively, X, Y, and Z). System 100 for sketching reality makes use of this characteristic to locate groups of lines through which vanishing points (vps) are estimated. FIG. 4 is an exemplary illustration of an architectural design to show that lines can be classified according to line direction(s) and vanishing point(s), according to one embodiment. In the example FIG. 4, the 2-D sketch includes two vanishing points, a left vanishing point and a right vanishing point. In another implementation the 2-D sketch may include one vanishing point or three vanishing points. When an architect draws a 2-D sketch 118, the architect may choose one, two, or three vanishing points. If there is only one intersection associated with most of the lines in the 2-D sketch, there is only one vanishing point. In this scenario, lines passing this vanishing point are according to the Y direction in the world coordinate system associated with the 2-D sketch. The lines of k=0 are according to the vertical line in the world coordinate system in the X direction (k is slope of a line, k=0 indicates the horizontal line, and k=∞ indicates the vertical lines). The lines of k=∞ are according to the horizontal line in the world, in Y direction.

To construct a geometry model 116, sketching reality module determines, for each pair of lines in the 2-D sketch 118, a hypothesized vanishing point $v_p$, and aggregates the fit for all other lines as follows. Given a line l and a hypothesized vanishing point $v_p$, sketching reality module 112 calculates the measure of fit according to:

$$g(l, v_p) = 1 - d(l, v_p)/T_a \qquad (1),$$

where $d(l,v_p)$ is the distance (d) function between line l and the vanishing point $v_p$ in 2-D sketch 118, $T_a$ is the threshold of the distance (e.g., a sensitivity parameter). In this implementation, the threshold is set to 0.35. In different implementations, the threshold can be set to different values.

Figure 5:
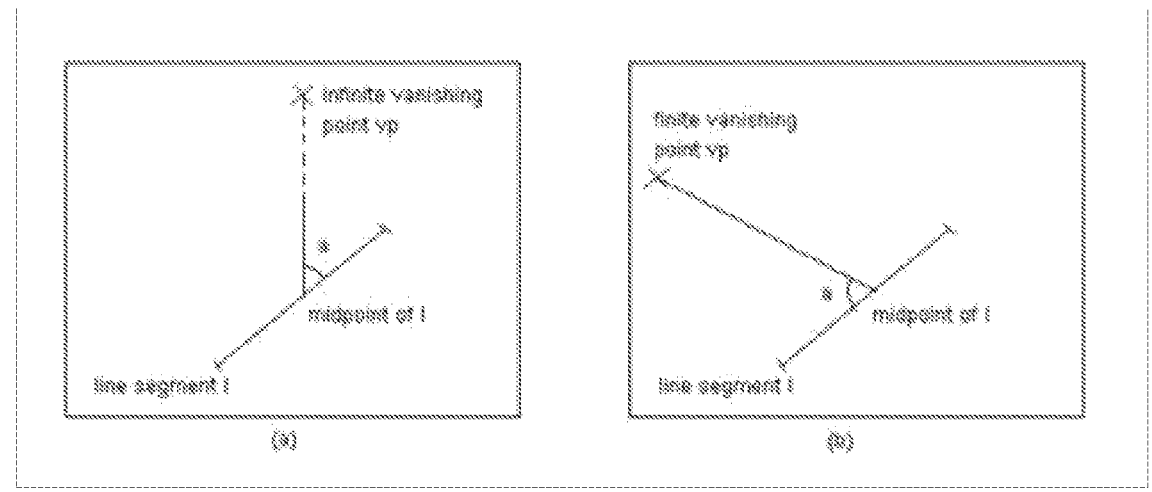
FIG. 5 shows an exemplary illustration of the distance function d(l,vp) between line l and a vanishing point vp, according to one embodiment.

FIG. 5 shows an exemplary illustration of the distance function $d(l,v_p)$ between line l and a vanishing point, according to one embodiment. Referring to FIG. 5, (a) represents an infinite vanishing point, and shows that an exemplary distance is the angle a between the line segment l and the direction of the infinite vanishing point. Referring to FIG. 5(*b*), a finite vanishing point is shown, wherein the distance is the angle a between the middle point of line segment l and the finite vanishing point. If the vanishing point is finite: $d(l,v_p)$= angle(l,V($v_p$)). If the vanishing point if infinite: $d(l,v_p)$= angle(l,l($v_p$,midpoint)).

Junction Identification

Figure 6:
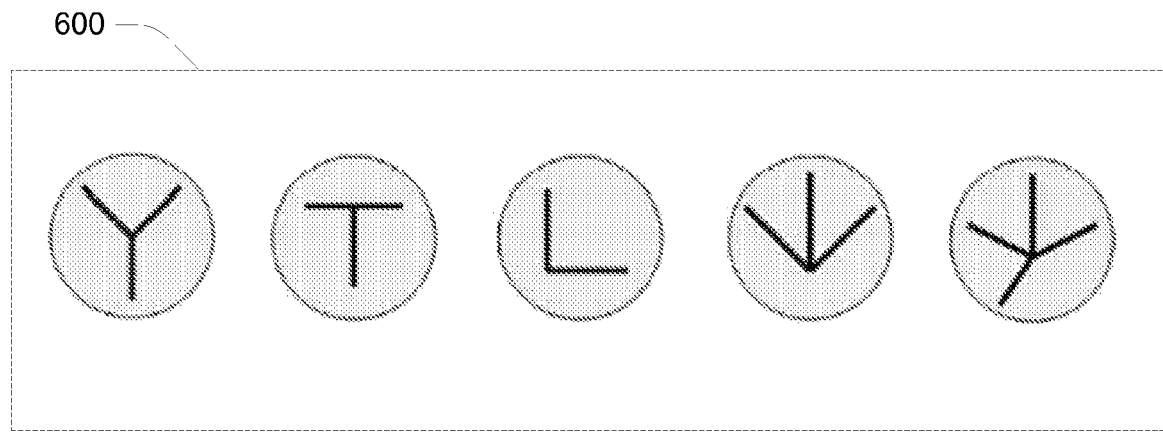
FIG. 6 shows a first exemplary set of line segment junctions, according to one embodiment.
Figure 7:
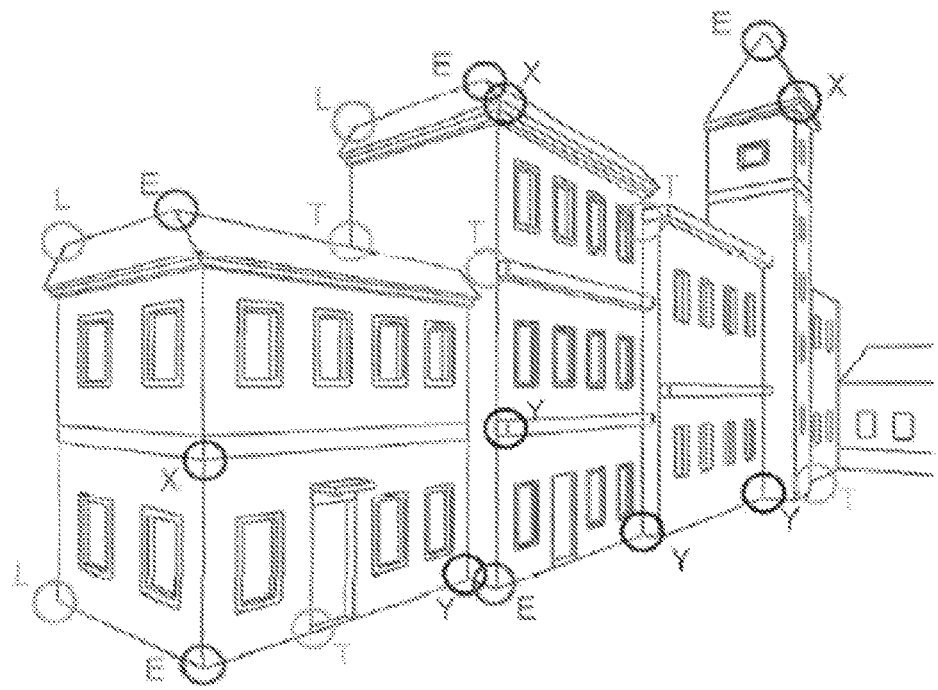
FIG. 7 shows vertices identified with an input 2-D sketch and corresponding junction labels, according to one embodiment.

FIG. 6 shows a first exemplary set 600 of line segment junctions, according to one embodiment. In this implementation, the junction types are Y, T, L, E, and X junctions. In a different implementation, different junction types can be used. A junction is an intersection point between two or more lines. Once lines of 2-D sketch 118 have been grouped in respective vanishing points determined, sketching reality module 112 identifies the type of junction at each vertex, and associates each face of 2.5D model 116 with an ordered list of vertices. To determine a respective junction type for a shared vertex, sketching reality module 112 determines a junction classification based on the angle of line segment intersection and the number of intersecting lines. A Y junction represents a common vertex where three visible surfaces meet. A T junction occurs when a surface is occluded by another surface, or when there is a dividing line on the face itself. An L junction is a corner of a face, whereas an E junction occurs when two visible faces meet along a common line. More generally, an X junction is the result of several faces meeting in a common vertex. FIG. 7 shows vertices identified with input 2-D sketch 118 and corresponding junction labels, according to one embodiment. A set of shared vertices and corresponding junctions (Y, T, L, E, and X) are circled and labeled in this example.

Exemplary Assignment of Ordered Vertices to Faces

Once the junction types and vanishing points was associated line directions have been determined, sketching reality module 112 determines topology of the 2.5D model 116 by associating an ordered list of vertices for each face. The graph G=(V, E) represents the topology, which encodes connectivity information between lines E and vertices V. Sketching reality module 112 assigns vertices from a single arbitrary vertex to faces (that contain that vertex) to other vertices (that are part of these faces), and so on. When we examine a face F having vertex V to determine its bounding lines, the candidate lines are those connected to vertex V. In one implementation, a greedy algorithm is used to choose the line that has the largest probability to be on the edge of the face. Geometrically, the lines of the same face cannot correspond to three vanishing points associated with three orthogonal directions.

For example, suppose a current face has k ordered lines $l_0, \ldots, l_{k-1}$, and $l_k$ is the candidate line. Suppose also the face is bounded by lines associated with two vanishing points $v_{pa}$ and $v_{pb}$. We define the likelihood of F to be a valid face as $$p(F\text{valid}|l_0, \ldots, l_k, v_{pa}, v_{pb}) = p(v_{pa})p(v_{pb})^{k+1}\sqrt{\prod_{i=0}^{k} p(l_i, v_{pa}, v_{pb})}.$$

The term $p(v_p)$ describes the likelihood that the vanishing point $v_p$ is consistent with F, i.e., $p(v_p)=\max_i g(l_i, v_p)$, with g( ) defined in (1). The term $p(l_i, v_{pa}, V_{pb})$ is a measure of the likelihood that the line $l_i$ corresponds to a vanishing point of F, and is defined as $p(l_i, v_{pa}, v_{pb})=\text{larger}(g(l_i, v_{pa}), g(l_i, v_{pb}))$, with larger( ) returning the larger of the two input parameters.

Given the three vanishing points $v_{p0}$, $v_{p1}$, and $v_{p2}$, sketching reality module 112 selects the pair of vanishing points that produces the largest value of $p(F\text{valid}|l_0, \ldots, l_k, v_{pa}, v_{pb})$ as the vanishing points of face F. If the largest $p(F\text{valid}|l_0, \ldots, l_k, v_{pa}, v_{pa})$ is small, we consider the face to be invalid; in this case, we terminate the propagation at the current vertex.

Figure 8:
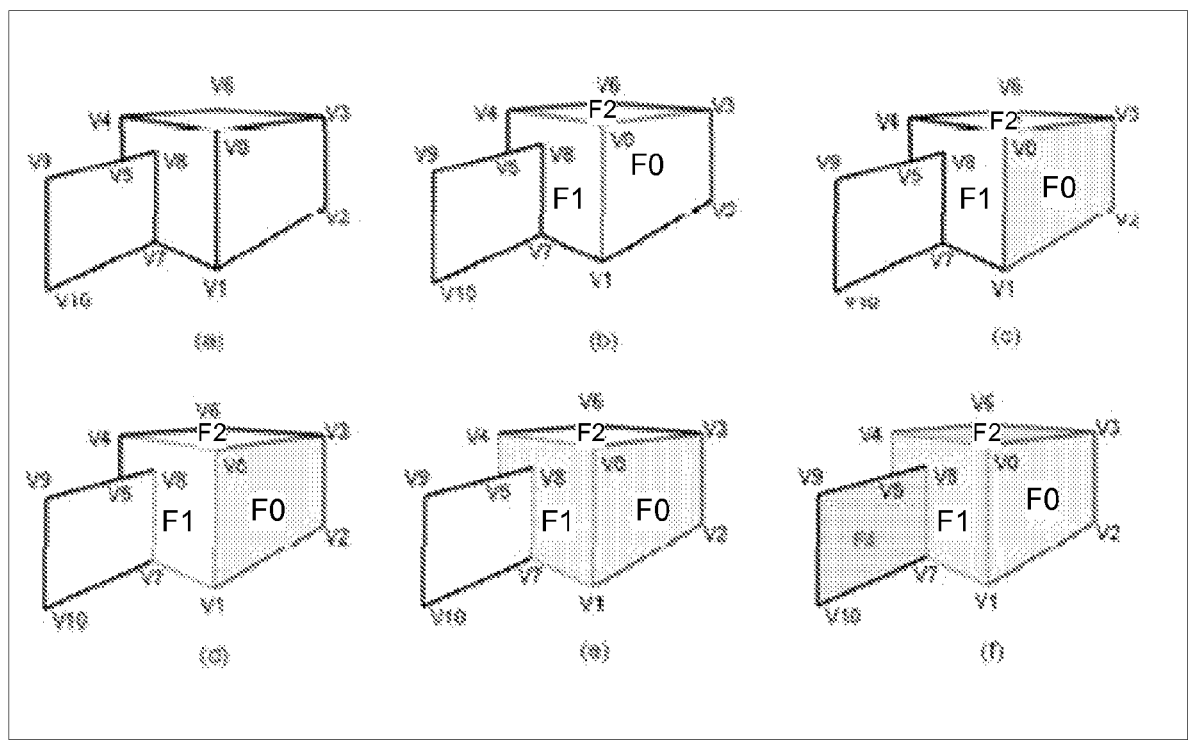
FIG. 8 shows an exemplary set of vertices face assignments, according to one embodiment.

FIG. 8 shows an exemplary set of vertices face assignments, according to one embodiment. Starting from an arbitrary vertex, in this example, V0 of FIG. 8(a), sketching reality module 112 assigns new faces according to local features of the junction. Since the starting vertex of this example corresponds to a Y junction, we have three new faces (with vertices initially assigned): F0:V1-V0-V3, F1:V4-V0-V1, and F2:V4-V0-V3, as shown in FIG. 8(b). Sketching reality module 112 traverses along the edges of each face to get a closed shape. For example, with respect to face F0 of FIG. 8(b), and starting from V3, there are two candidate lines: V3-V2 and V3-V6. Sketching reality module 112 chooses V3-V2 because it closes the loop for F0. The loop is thus V1-V0-V3-V2-V1, as shown in FIG. 8(c). With respect to face F1, and starting from V1, sketching reality module 112 proceeds towards V7 and V8. However, the propagation ends because V8-V9 is not consistent with the face, as shown in FIG. 8(d). As a result, sketching reality module 112 instead propagates from the other end to V4, then to V5. Since V4-V5 is an occluded line (V5 being a T junction), the propagation again terminates. In this example, we end up with an incomplete loop V5-V4-V0-V1-V7-V8, as shown in FIG. 8(e). With respect to face F2, by straightforward traversal, sketching reality module 112 determines vertices V4-V0-V3-V6-V4. At this point, and in this example, sketching reality module 112 proceeds to another vertex that is part of at least one unassigned face to repeat the above described vertex assignment operations. Eventually, this results in each face of FIG. 8 being assigned respective vertices, as shown in FIG. 8(f).

Shape Split or Completion

Figure 9:
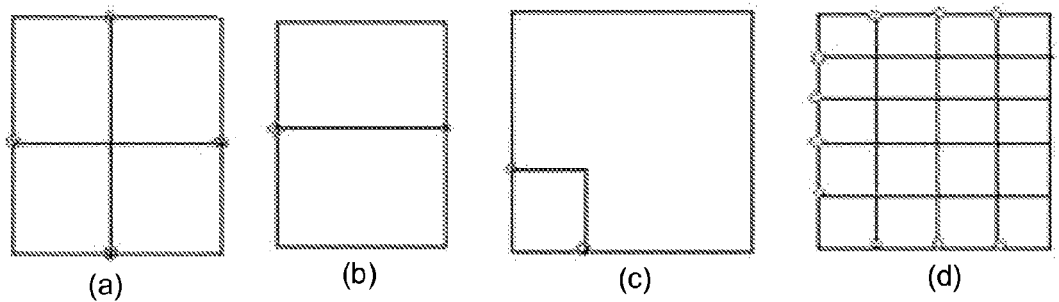
FIG. 9 shows four exemplary types of split shapes/polygons, according to one embodiment.

An incomplete region caused by a T junction may be caused by one or more split lines on an existing shape, or an occluded plane. FIG. 9 shows four exemplary types of split shapes/polygons, according to one embodiment. When generating a 2-D sketch 118, architects typically draw lines on an existing plane to divide it into several regions. The split lines are not classified to be boundary of any regions. The following figure shows some cases of split lines. In this example, the circled endpoints represent key junctions. In these examples, the XY (left, right) line is contained in one complete shape. So sketching reality module 112 splits the complete shape into several children shapes contained in the complete shape. The results are matched to one of the four types of split shapes shown in FIG. 9. For line segments trending left to right, the following set of shape splitting criteria (or split shape completion criteria) is utilized:

Referring to FIG. 9, region (a)—FIG. 9(a), there are four junctions: two crossed lines with four T junctions; each junction on each border of the quadrangle. So the quadrangle is split to four quadrangles.

Referring to FIG. 9(b), the two junctions are on the opposite borders of the quadrangle; the quadrangle is split to two quadrangles.

Referring to FIG. 9(c), the two T junctions are on the same line; the quadrangle is split to a large one and a small one.

Referring to FIG. 9(d), the two junctions are on two connected lines. The quadrangle is split to a large one and a small one.

Figure 10:
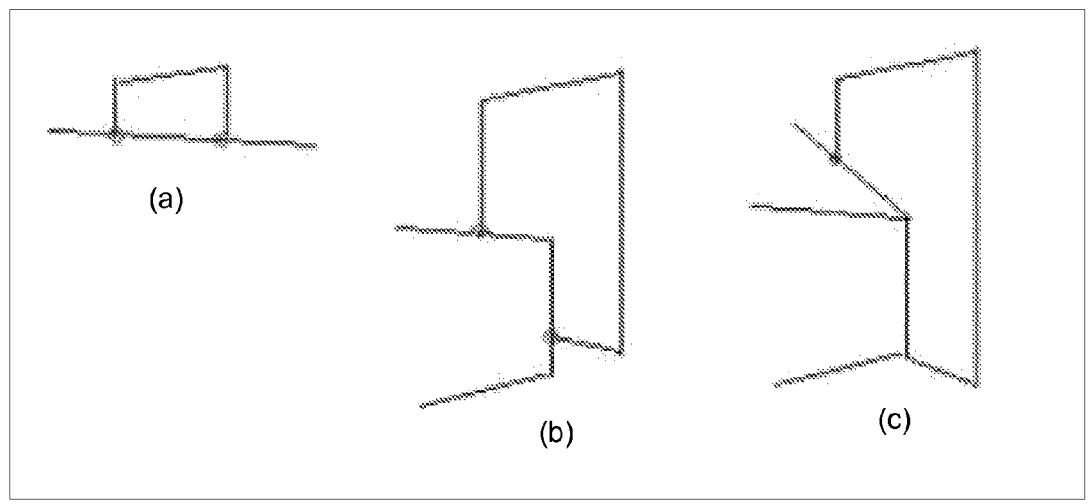
FIG. 10 shows three exemplary types of occluded shapes, according to one embodiment.

FIG. 10 shows three exemplary types of occluded shapes, according to one embodiment. In these examples, circled endpoints represent T-junctions. In an occluded shape, the WXZ line (left, right, vertical directional) of the junction is the occluding line of the shape. Sketching reality module 112 adds a new line segment to complete the shape with parallel and perpendicular constraints in view of a set of occluded shape completion criteria. More particularly, and in this implementation, to create a proper shape, sketching reality module 112 locates a best match in a database of T junctions. Referring to FIG. 10(a), the XW of one junction is same with the ZX of the other junction. In this scenario, sketching reality module 112 adds a line parallel with the connected line on the X point of each junction, and selects a border to form a larger shape. Referring to FIG. 10(b), the XW of one junction is different from the ZX of the other junction in this scenario, sketching reality module 112 extends the YX direction of each junction; the intersection is the added vertex of the shape. Referring to FIG. 10(c), there is only one T junction. In this scenario, sketching reality module 112 locates a last line parallel with the XY to complete the shape between the X and the endpoint of the line, as described above with respect to FIG. 10(a). FIG. 10 shows an exemplary set of additive lines (the dashed lines) used by the systems and methods for sketching reality to complete one or more respective occluded shapes, according to one embodiment.

Figure 11:
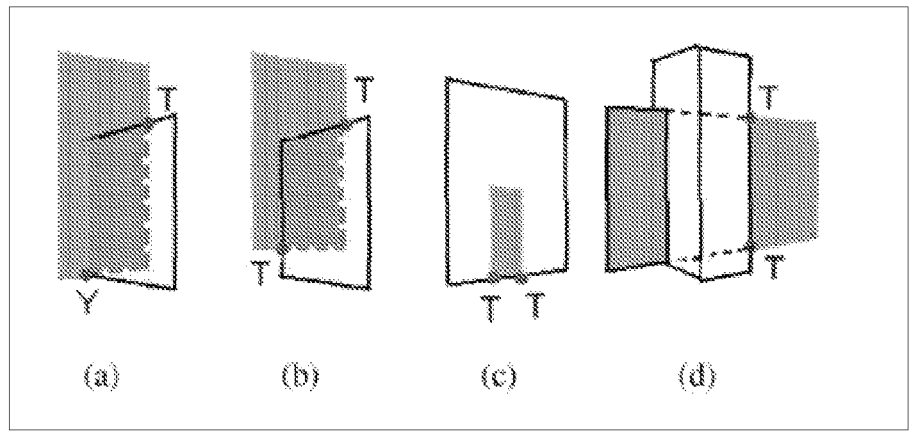
FIG. 11 shows another example of occluded shapes, according to one embodiment.

FIG. 11 shows another example of occluded shapes, according to one embodiment. FIG. 11(a) shows an occluded shape associated with vertices of a T-junction and a Y-junction. FIG. 11(b) shows an occluded shape associated with vertices of two T-junctions. The last two examples of FIG. 11 are special because the two end lines of T junctions are parallel and no intersection points can be found. In this scenario, sketching reality module 112 checks if the uncompleted face is contained within another face, as described above in the split shape scenario, to simply connect the two T junctions (FIG. 11(c)). Otherwise, sketching reality module 112 attempts to find a different face with which to connect, as shown in FIG. 11(d).

As sketching reality module 112 locates closed shapes representing surfaces of 2.5D model 116, sketching reality module 112 evaluates relationships between the shapes to determine if one or more small shapes are contained in a larger shape. From the order of closed shape formation and the determined shape containing relationships, sketching reality module 112 determines the general position of the shapes such that a first completed shape is on a topmost layer of 2.5D model 116, and a last completed shape is on a bottom layer of the 2.5D model 116. If one or more shapes are encapsulated by another shape, encapsulated shapes are children of the shape (a parent shape). Sketching reality module 112 uses such parent-child relationships to determine order of texture mapping operations. A region contained in another region is on a same plane with the other region. Thus, sketching reality module 112 groups regions with inclusion relations to a same surface. Each surface consists of several layers with different depth. The layer with lowest depth is at the bottom of the surface while the layer with highest depth on the top. In this scenario, there are several regions of similar type on each layer.

Geometry Construction (2.5D Coordinate Calculation)

Figure 12:
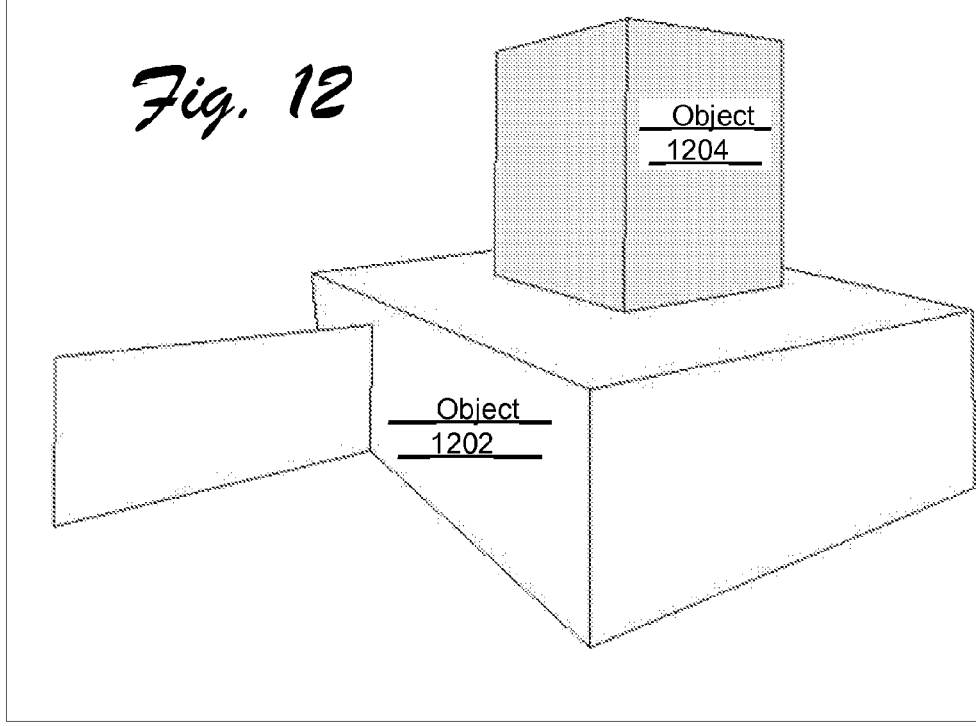
FIG. 12 is an exemplary illustration showing that regions with one common vertex that is not part of a T-junction belong to a same object, according to one embodiment.

FIG. 12 is an exemplary illustration showing that regions with one common vertex that is not part of a T-junction belong to a same object, according to one embodiment. In the example of FIG. 12, sketching reality module 112 identifies two objects (i.e., 1202 and 1204) from 2-D sketch 118. In this implementation, to recover the geometry of an object from a 2-D sketch 118, sketching reality module 112 calculates the relative positions between the vertices. This is now possible because we know the camera intrinsic parameters, line grouping (for orthogonality constraints), and face and vertex labels. Given two adjacent vertices $V_1$ and $V_2$ (with 3D positions $q_1$ and $q_2$, respectively) and the vanishing point $v_p(=(x_p, y_p)^T)$ corresponding to line $q_1q_2$, we have the constraint $$q_1 - q_2 = \text{sgn}(q_{1z} - q_{2z}) \frac{q_{1z}\|H(q_1) - H(q_2)\|}{f\|v_p - H(q_2)\|}(x_p, y_p, f)^T,$$

where f is the pre-computed focal length, $q_z$ is the z-component of q, H(q) is the projection of 3D point q onto the image plane, and superscript "T" represents vector transpose. The sign function sgn(x) is positive if $x \geq 0$ and negative otherwise. If the vanishing point is at infinity, the constraint is modified as follows:

$$q_1 - q_2 = \text{sgn}(q_{1z} - q_{2z}) \frac{q_{1z}\|H(q_1) - H(q_2)\|}{f}(x_p, y_p, 0)^T.$$

Sketching reality module 112 sets an arbitrary vertex to be the reference 3D point $(0, 0, f)^T$, whose position is then propagated to the other vertices using the above formulas.

Figure 13:
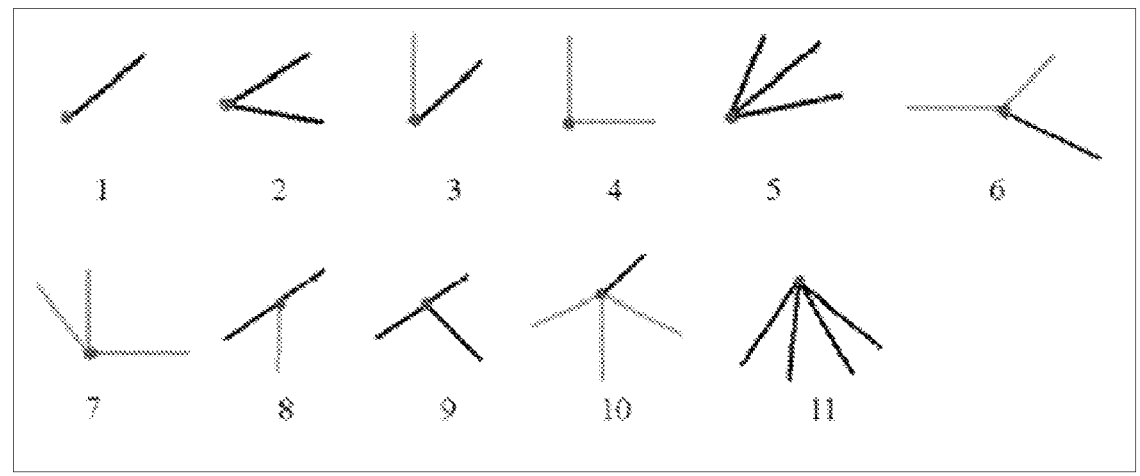
FIG. 13 shows an exemplary set of common architectural components for reconstructing an ambiguous part of a 2-D sketch, according to one embodiment.

It is possible for a line to not correspond to any known vanishing point (and hence having an unknown direction). As a result, it is not possible to calculate the coordinates of the vertices of such lines. To handle this problem, sketching reality module 112 utilizes a model library of common architectural components, and reconstructs any ambiguous part of the architecture drawing 118 with the best matched model. Each model is presented as a labeled graph G=(V, E), as described above. The label of each vertex is based on the junction type and the relationship between the edges to the vertex. FIG. 13 shows an exemplary set of common architectural components for reconstructing an ambiguous part of a 2-D sketch 118, according to one embodiment. As shown in FIG. 13, and in this implementation, vertex labels (1-11) are based on junction types. A line which is along one of the three known directions is lighter as compared to the darker unknown line(s). Sketching reality module 112 adjusts the graph matching algorithm using a known random walk procedure to match the labeled graph. The likelihood of following a given arc from one node is defined as $f_i(L_p, L_q) = \sqrt{L_p * L_q}$. The probability of jumping from the vertex q to vertex p is defined as $f_j(L_p, L_q) = L_p$.

Sketch-Based Photorealistic Rendering

Figure 14:
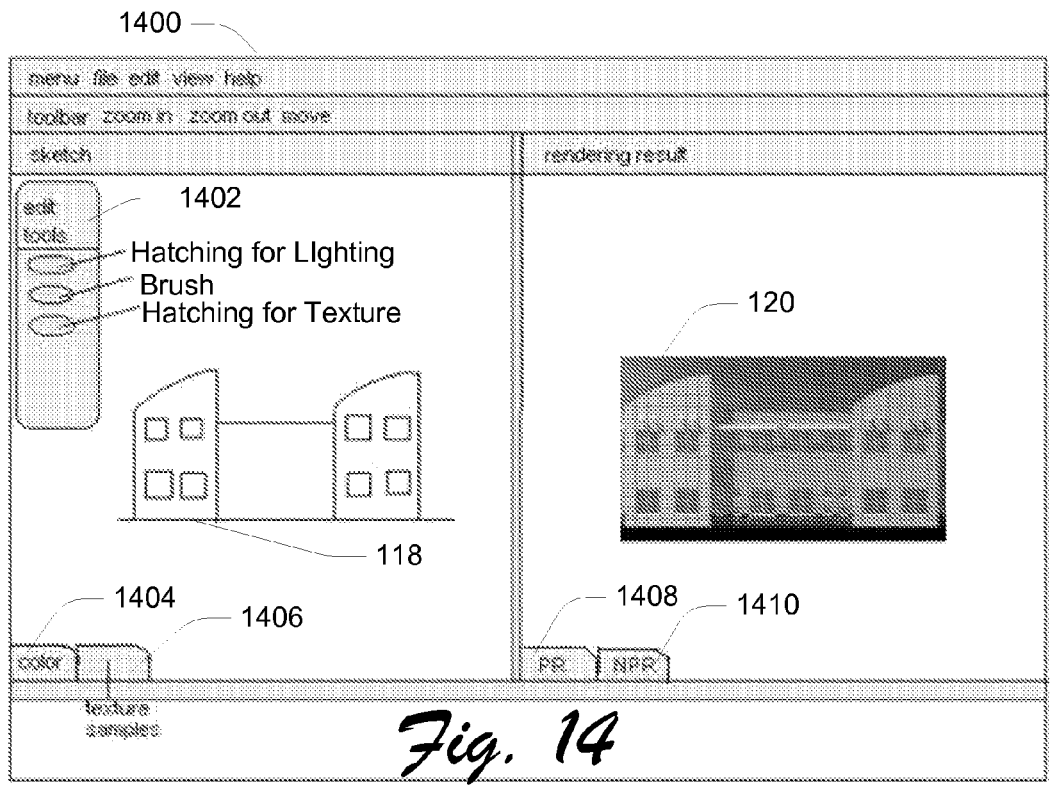
FIG. 14 shows an exemplary sketch-based interactive user interface (UI) 1400 for generating a photorealistic rendering from a 2-D sketch, according to one embodiment.
Figure 15:
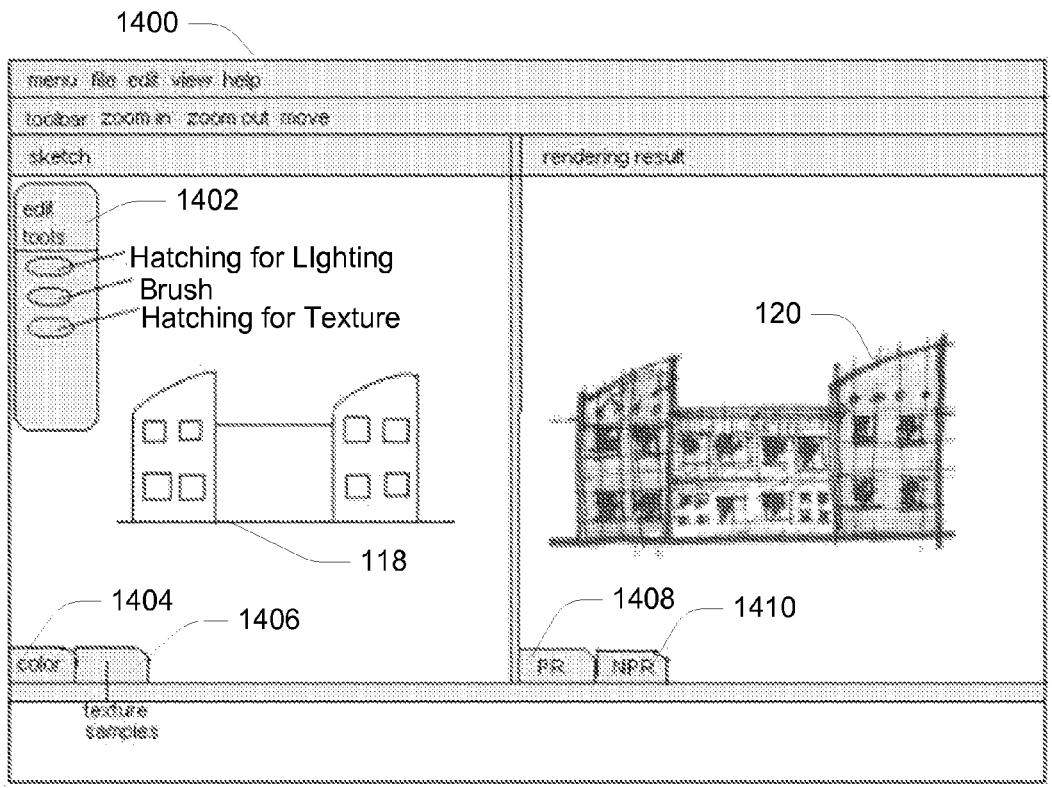
FIG. 15 shows the exemplary sketch-based interactive user interface of FIG. 14, with the exception that the presented exemplary rendering is non-photorealistic as compared to the photorealistic rendering shown in FIG. 14.

FIG. 14 shows an exemplary sketch-based interactive user interface (UI) 1400 for generating a photorealistic rendering from a 2-D sketch, according to one embodiment. In this implementation, UI 1400 represents a UI 122 of FIG. 1. In one implementation, sketching reality module 112 presents user interfaces with UI 1400 on a display device 126 for a user to edit 2-D sketch 118 in the sketch window. Such editing specifies, for example, desired lighting, texture, color, etc., of the final sketch-based rendering result 120 (e.g., shown in a rendering result window). FIG. 15 shows the exemplary sketch-based interactive user interface 1400 of FIG. 14, with the exception that rendering 120 is non-photorealistic as compared to the photorealistic rendering 120 of FIG. 14. These and other aspects of UI 1400 are now described in greater detail.

UI 1400 provides a user with sketch-based interactive rendering capabilities to obtain desired texture, viewpoint, lighting conditions, etc. In this implementation, a user edits 2-D sketch 118, and responsive to such user edits, sketching reality module 112 renders and presents sketch-based rendering result 120 to the user. For example, in this implementation, a user can draw hatching on 2-D sketch 118 to indicate lighting, texture, etc. In this implementation, the user can also select texture directly from a texture library. In one implementation, the user can also adjust color of the architecture using a brush.

Exemplary Specification of Lighting Direction

In one implementation, a user utilizes a hatching edit tool 1402 to draw one or more hatching strokes over 2-D sketch 118. The hatching which the user draws on the sketch may stand for the lighting or the texture. With respect to lighting, one or more user provided hatching strokes indicate placement and degree of shading or shadow to be rendered in the sketch-based rendering result 120. For purposes of exemplary illustration, such hatching strokes/input are shown as respective portion of "other program data" 122 of FIG. 1. In view of such hatching input, sketching reality module 112 determines light source parameters for the 2.5D model 116. Such light source parameters include, for example, position, direction, and intensity. The direction, position, and intensity are deduced from the position and the density of the hatching. Responsive to receiving such hatching input, sketching reality module 112 presents the indicated degree of shading/shadow in view of the determined light source parameters in sketch-based rendering result 120.

Figure 16:
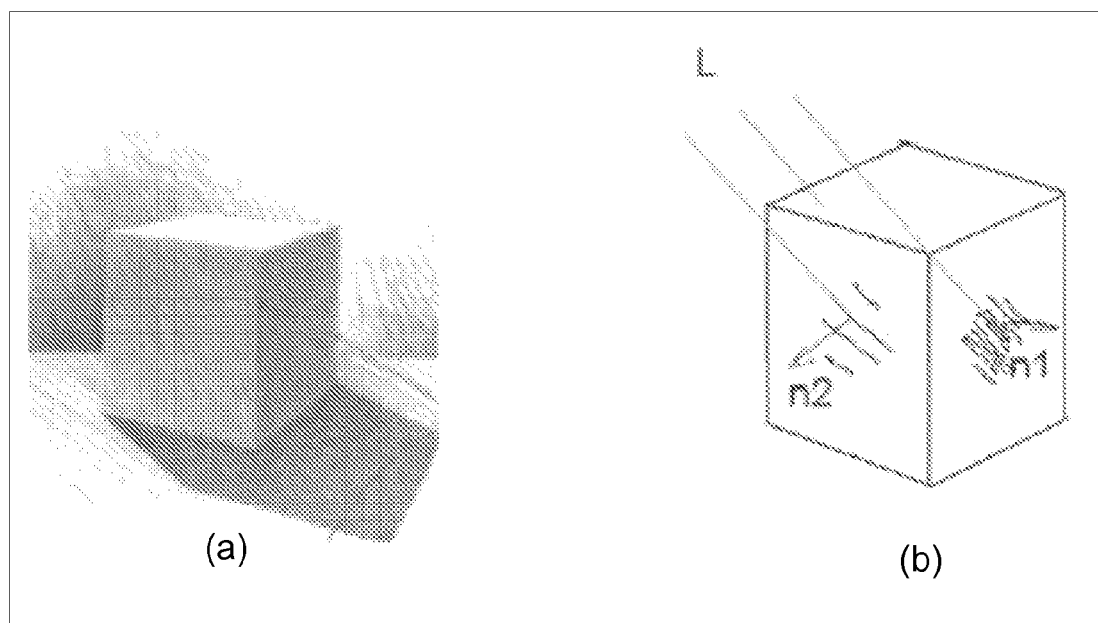
FIG. 16 shows an exemplary illustration of specifying lighting direction and shadow density, according to one embodiment.

FIG. 16 shows an exemplary illustration of specifying lighting direction and shadow density, according to one embodiment. Referring to FIG. 16, (a) is a stylistic rendering of a block showing a lighting direction from the left. FIG. 16(b) shows an exemplary 2.5D model 116 with user supplied hatching strokes with different respective densities on the faces to specify the lighting direction ("L") and shadow density. In this example, "n1" and "n2" refer to the normals of the respective faces. In architecture, the light source is usually the sun. As a result, the light rays are parallel. Assuming the surfaces are mostly Lambertian, the intensity of a surface under directional light is $$I = k_d I_l \cos(\theta),$$

where $k_d$ is the reflectance of the surface, $I_l$ is the intensity of the light source, and $\theta$ is the angle between the normal of the surface and the light direction.

Given the sun as a light source, $\theta$ is constant everywhere on a flat surface. As a result, the intensity is uniform throughout the flat surface (in one implementation, inter-reflections are ignored). With this simplification, and in one implementation, sketching reality module 112 interprets light direction based on the relative intensities at the different surfaces. For example, suppose the light source direction is $L(l_1,l_2,l_3)$ with $\|L\|=1$. Then, for each surface, we have the following constraint:

$$I_i = k_d I_l \cos(\theta_i) = k_d I_l N_i \cdot L,$$

where $N_i$ is the normal of surface i and $I_i$ is the relative intensity of surface i computed from the hatching drawn by a user. Here, we use the average intensity of the hatching area on the surface to define $I_i$.

Figure 17:
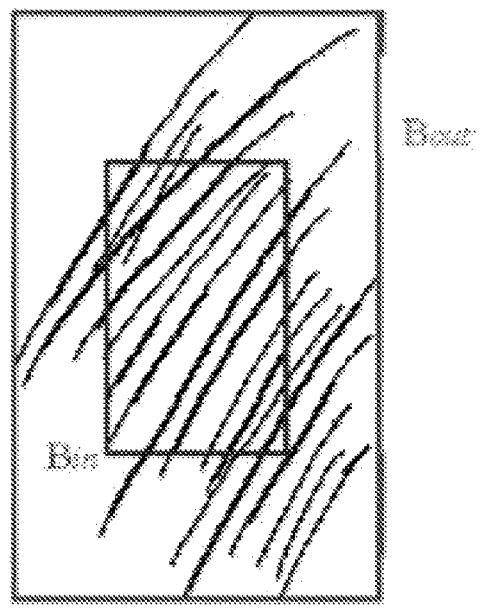
FIG. 17 shows an exemplary specification of bounds for a shading surface, according to one embodiment.

Sketching reality module 112 assumes $I_l$ and $k_d$ to be constant for a whole object (one or more respective portions of a 2.5D model 116), such that $k_d I_l = 1$. Given the possible inaccuracy of the sketching 118, in one implementation, sketching reality module 112 sets constraints for each shading surface as follows:

$$I_{li} \leq k_d I_l N_i \cdot L \leq I_{hi},$$

with $I_{li}$ and $I_{hi}$ being the average intensities of $B_{out\ and\ Bin}$, as shown in FIG. 17. FIG. 17 shows an exemplary specification of bounds for a shading surface, according to one embodiment. In this example, $B_{out}$ is the bounding box covering all the hatches, while $B_{in}$ is a centered box half the size of $B_{out}$. Sketching reality module 112 utilizes a number of constraints corresponding to the number of hatched surfaces. In order to find a unique solution for the light direction, sketching reality module 112 optimizes the term $\Sigma N_j \cdot L$, where $Nl_j$ are the surfaces that were not shaded by the user. In other words, a solution is found that maximizes the sum of intensities of the non-shaded surfaces while satisfying the constraints of the shaded surfaces.

Exemplary Texture Selection

In one implementation, a user utilizes a texture edit tool 1402 to draw or select a texture for a closed area of 2.5D model 116. For example, in one implementation, the user directly draws hatch strokes over 2-D sketch 118 or 2.5D model 116 to indicate what the texture looks like on an object (e.g., directly draws a likeness of the desired texture). In view of these user inputs, sketching reality module 112 automatically selects a proper texture for the object. In one implementation, sketching reality module 112 matches the user input with a stored/index to drawing of the texture to retrieve a best texture match. In one implementation, sketching reality module 112 presents illustrations of one or more possible textures onto UI 1400 that correspond to the user inputs from which the user can choose. This texture provisioning is independent of the user searching for a texture for an object in a texture database, but is instead based on an objective measure of line-likeness.

Line-likeness is used in texture analysis to describe the shape of the texture element. Both the strokes and index line drawing in our texture library are black-and-white images composed of lines, so only shape is considered during matching, which is well described by line-likeness. Line-likeness is calculated based on the direction co-occurrence matrix whose element $P_d(i,j)$ is defined as the relative frequencies of two grey values i and j occurring along the edge direction by the distance d on the image. For one direction d, the line-likeness measure is defined as $$F_{line} = \frac{\sum_{i=0}^{n} \sum_{j=0}^{n} P_d(i,j) \cos\left[(i-j)\frac{2\pi}{n}\right]}{\sum_{i=0}^{n} \sum_{j=0}^{n} P_d(i,j)},$$

where n is the grey level number between 0 and 255. In one implementation, sketching reality module 112 utilizes four directions (1,0), (0,1), (1,1), (1,−1) to calculate the direction co-occurrence matrix $P_d$ and calculate the average $F_{line}$ of the four directions as a similarity measure between the strokes drawn by user and the texture index line drawing. After computing the matched texture index, the system retrieves the compatible textures. The user can then select any one of these textures. Each texture has the notion of relative scale, so that once the global scale has been chosen, the chosen texture is scaled appropriately and synthesized to cover the surface (not stretched to fit). In one implementation, exceptions to this rule are windows and doors—wherein, the texture is rescaled to map to the entire surface.

In one implementation, "other program data" 122 includes a texture library based on a texture symbols index. The user draws texture symbols on the 2-D sketch 118. Sketching reality module 112 matches the drawn texture symbols to one or more symbols in the texture symbol index to identify a corresponding texture to be retrieved from the library for texturing an object or polygon. Standard architecture symbols to represent different materials are known. In one implementation, sketching reality module 112 utilizes such symbols to index the texture library. The retrieved texture is mapped by sketching reality module 112 to the corresponding surface(s) of 2.5D objects 116 as they are illustrated in the rendering result 120. In one implementation, and due to different texture sample sizes, sketching reality module 112 synthesizes texture on a surface. In another implementation, when providing texture to a window, door, etc., the texture is mapped directly to the object quadrangle.

Colorization

UI 1400 provides a color selection control 1404 for a user to change color of a selected object associated with the 2-D sketch 118. In one implementation, sketching reality module 112 presents color selection control 1404 to the user in the form of a set of color swatches, a text input control for direct RGB value inputs from the user, and/or so on. In one implementation, after a user selects a color, UI 1400 allows the user to draw one or more patches on 2-D sketch 118 surfaces to modify the color of associated surfaces of the 2.5D model 116.

Geometry Update

UI 1400 allows a user to modify geometry of 2-D sketch 118, e.g., by adding lines, deleting lines, resizing, modifying angles, etc. Techniques to perform such edits are known. Responsive to user modification of 2-D sketch 118, sketching reality module 112 updates the 2.5D geometry model 116 to correspond to the modification(s) of the 2-D sketch 118.

An Exemplary Procedure

Figure 18:
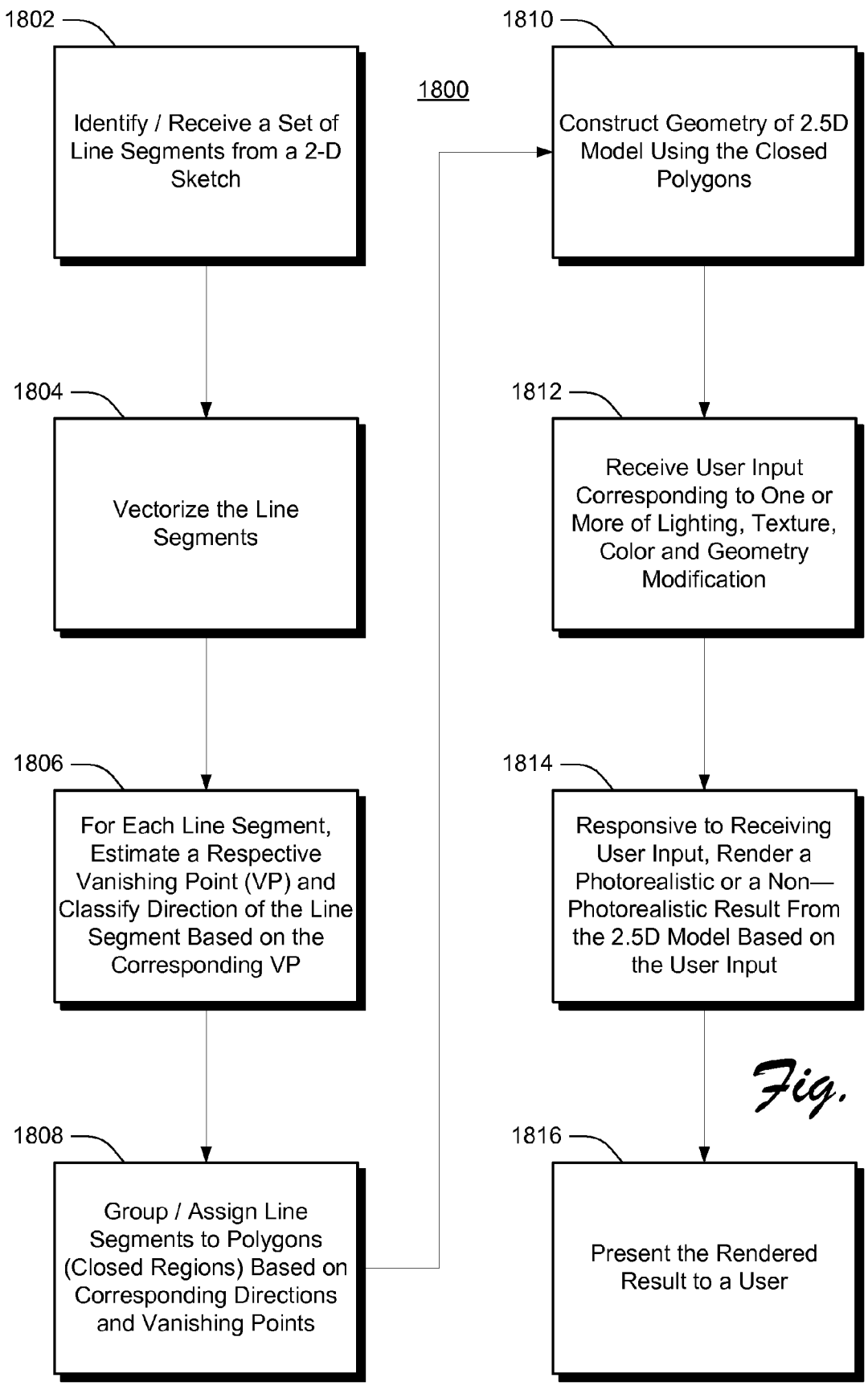
FIG. 18 shows an exemplary procedure for sketching reality, according to one embodiment.

FIG. 18 shows an exemplary procedure 1800 for sketching reality, according to one embodiment. For purposes of exemplary illustration, the operations of procedure 1800 are described with respect to the above described aspects of FIGS. 1 through 17. In one implementation, the operations of procedure 1800 are implemented by sketching reality module 112. Operations of block 1800 to identify a set of line segments from a 2-D sketch. In one implementation, the line segments represent vector primitives from 2-D sketch 118. Operations of block 1804 vectorize the line segments to generate straight lines. For purposes of exemplary description, the vectorized lines are hereinafter referred to as line segments, or lines. Operations of block 1806, for each line segment, estimate a respective vanishing point, and classify direction of each line segment based on the line segment's corresponding vanishing point. Operations of block 1808 group respectable ones of the line segments to respectable ones of multiple polygons based on line directions and vanishing points. Operations of block 1810 construct geometry of a 2.5D model using the closed polygons. In one implementation, the 2.5D model is represented by 2.5D model 116. Operations of block 1812 receive user input corresponding to one or more of lighting, texture, color, and geometry modification. Operations of block 1814, responsive to receiving the user input, render a photorealistic or a non-photorealistic result from the 2.5D model based on the user input. Operations of block 1816 present the rendered result to a user. In one implementation, the rendered result is sketch-based rendered result 120.

Conclusion

Although sketching reality has been described with reference to FIGS. 1 through 18 in language specific to structural features and/or methodological operations or actions, it is understood that the implementations defined in the appended claims are not necessarily limited to the specific features or actions described. Rather, the specific features and operations discussed above are disclosed as exemplary forms of implementing the following claimed subject matter.

The invention claimed is:

1. A method at least partially implemented by a computing device, the method comprising:
    using a computing device to identify a set of vector primitives from a 2-D sketch wherein the vector primitives comprise one or more of a set of line segments and a set of curves;
    generating a graph structure that indicates spatial relations between respective ones of the identified vector primitives;
    using the graph structure to classify lines as left, right, or vertical and identify line segment vanishing lines;
    identifying a set of line segment endpoint junctions;
    classifying each line segment endpoint junction based on a angle of line segment intersection and a number of intersecting lines at each line segment endpoint junction;
    automatically generating a 2.5D geometry model from the vector primitives on the computing device;
    receiving user input corresponding to one or more of lighting, texture, color and geometry modification of the 2.5D geometry model, wherein the user input is user drawn hatch strokes for calculating light position, direction, and intensity;
    computing a matched texture index by calculating line-likeness for the user drawn hatch strokes, wherein the line-likeness calculated based on a direction co-occurrence matrix;
    computing lighting position, intensity and direction from the position and density of the user drawn hatch strokes, wherein lighting intensity is calculated by:

$I = k_d I_i \cos(\theta)$, wherein $I$ is intensity, $k_d$ is a reflectance coefficient, $I_i$ is the intensity of the light source, and $\theta$ is the angle between the normal of a surface and the light direction; and
    rendering the 2.5D geometry model for presentation to a user on a display.

2. The method of claim 1, wherein the 2-D sketch is hand-drawn.

3. The method of claim 1, wherein automatically generating the 2.5D geometry model further comprises generating a respective line vector from respective ones of the vector primitives to remove non-linear aspects from respective ones of the vector primitives.

4. The method of claim 1, wherein automatically generating the 2.5D geometry model further comprises:
    estimating a respective vanishing point for at least a subset of the vector primitives; and
    wherein respective surfaces of the 2.5D geometry model are based on respective ones of the vector primitives in view of associated vanishing point(s).

5. The method of claim 1, wherein automatically generating the 2.5D geometry model further comprises assigning respective ones of the line segments to polygons of the 2.5D model.

6. The method of claim 1, wherein rendering further comprises rendering the 2.5D geometry model as a photorealistic image.

7. The method of claim 1, wherein rendering further comprises rendering the 2.5D geometry model as a non-photorealistic image.

8. The method of claim 1, wherein the method further comprises:
    responsive to receiving the user input, rendering the 2.5D geometry model with characteristics based on the user input.

9. The method of claim 8, wherein the user input is user drawn hatch strokes for specifying texture.

10. The method of claim 8, wherein the user input is a texture symbol, and wherein the method further comprises:
    searching a symbol indexed texture library for a texture corresponding to the texture symbol; and
    rendering a region of the 2.5D geometry model with the texture, the region being identified by user placement of the texture symbol.

11. A tangible computer-readable storage medium comprising computer-program instructions executable by a processor, the computer-program instructions when executed by the processor perform acts comprising:

use a computing device to identify a set of vector primitives from a 2-D sketch wherein the vector primitives comprise one or more of a set of line segments and a set of curves;

generate a graph structure that indicates spatial relations between respective ones of the identified vector primitives;

use the graph structure to classify lines as left, right, or vertical and identify line segment vanishing lines;

identify a set of line segment endpoint junctions;

classify each line segment endpoint junction based on a angle of line segment intersection and a number of intersecting lines at each line segment endpoint junction;

automatically generate a 2.5D geometry model from the vector primitives on the computing device;

receive user input corresponding to one or more of lighting, texture, color and geometry modification of the 2.5D geometry model, wherein the user input is user drawn hatch strokes for calculating light position, direction, and intensity;

compute a matched texture index by calculating line-likeness for the user drawn hatch strokes, wherein the line-likeness calculated based on a direction co-occurrence matrix;

compute lighting position, intensity and direction from the position and density of the user drawn hatch strokes, wherein lighting intensity is calculated by:

$I = k_d I_i \cos(\theta)$, wherein I is intensity, $k_d$ is a reflectance coefficient, $I_i$ is the intensity of the light source, and $\theta$ is the angle between the normal of a surface and the light direction; and render the 2.5D geometry model for presentation to a user on a display.

12. A computing device comprising:

a processor; and a memory coupled to the processor, the memory comprising computer-program instructions executable by the processor, the computer-program instructions when executed by the processor for performing acts comprising:

use the computing device to identify a set of vector primitives from a 2-D sketch wherein the vector primitives comprise one or more of a set of line segments and a set of curves;

generate a graph structure that indicates spatial relations between respective ones of the identified vector primitives;

use the graph structure to classify lines as left, right, or vertical and identify line segment vanishing lines;

identify a set of line segment endpoint junctions;

classify each line segment endpoint junction based on a angle of line segment intersection and a number of intersecting lines at each line segment endpoint junction;

automatically generate a 2.5D geometry model from the vector primitives on the computing device;

receive user input corresponding to one or more of lighting, texture, color and geometry modification of the 2.5D geometry model, wherein the user input is user drawn hatch strokes for calculating light position, direction, and intensity;

compute a matched texture index by calculating line-likeness for the user drawn hatch strokes, wherein the line-likeness calculated based on a direction co-occurrence matrix;

compute lighting position, intensity and direction from the position and density of the user drawn hatch strokes, wherein lighting intensity is calculated by:

$I = k_d I_i \cos(\theta)$, wherein I is intensity, $k_d$ is a reflectance coefficient, $I_i$ is the intensity of the light source, and $\theta$ is the angle between the normal of a surface and the light direction; and render the 2.5D geometry model for presentation to a user on a display.

13. The computing device of claim 12 wherein the act of rendering is a photorealistic rendering.

* * * * *